May 3, 1938.  C. R. SIMMONS  2,116,327

MACHINE FOR TEMPERING SPRINGS

Original Filed May 8, 1935   7 Sheets-Sheet 1

Inventor.
Charles R. Simmons
By Rudolph Wm Lotz
Attorney.

May 3, 1938. C. R. SIMMONS 2,116,327
MACHINE FOR TEMPERING SPRINGS
Original Filed May 8, 1935 7 Sheets-Sheet 4

Inventor
Charles R. Simmons
By Rudolph Wm Lotz
Attorney

May 3, 1938. C. R. SIMMONS 2,116,327
MACHINE FOR TEMPERING SPRINGS
Original Filed May 8, 1935 7 Sheets-Sheet 5

Fig. 6.

Inventor.
Charles R. Simmons
By Rudolph Jr.
Attorney.

Patented May 3, 1938

2,116,327

UNITED STATES PATENT OFFICE 2,116,327

MACHINE FOR TEMPERING SPRINGS

Charles R. Simmons, Chicago, Ill., assignor to Nachman Spring-Filled Corporation, Chicago, Ill., a corporation of Illinois Application May 8, 1935, Serial No. 20,432
Renewed October 5, 1937

27 Claims. (Cl. 219—11)

The present invention has for its object to provide a machine which includes a source of supply of springs to be tempered, for delivery of said springs at regular intervals, together with means for guiding and delivering the same upon carriers arranged to cause said springs to be subjected successively to the action of an electric heating current during a predetermined interval and effecting automatic control of said interval, automatic control of delivery of springs from the carrier to chilling means for completing the hardening process.

A further object of the invention is to provide a carrier equipped with spring-engaging contact members connected with the respective poles for cooperation with the springs to close the electric circuit through the latter which are arranged to engage the springs at points spaced from the terminals of the latter a predetermined distance so as to leave the terminal end portions of the springs cool, while bringing the remainder of the spring up to the requisite temperature preparatory to subjecting the same to chilling action to complete the hardening process.

Other objects of the invention are to provide relatively simple and efficient means for automatically producing the springs and effecting delivery thereof in hardened condition.

A suitable embodiment of the invention is illustrated in the accompanying drawings, wherein.

The machine of the present invention is designed and adapted to carry out the method of hardening springs which is described and claimed in my pending application for Letters Patent Ser. No. 16,018 filed April 12, 1935, which discloses the method as consisting in heating upholstery springs electrically between points spaced from the terminals of said springs so as to leave said terminal end portions of the latter in annealed and malleable condition, which permits knotting of said springs without occasioning the breakages incident to endeavoring to knot said springs by coiling hardened end portions of the same about another part of the spring or about a terminal coil of an adjacent spring or other member in which the spring is to be secured.

In the upholstery art and particularly in the manufacture of spring assemblies for upholstery wherein knotted springs are most desirable or necessary, or wherein springs knotted to each other are to be used, it has long been sought to solve the problem of providing springs hardened to a degree which would prevent the gradual shortening of the springs under the influence of load thereon and at the same time avoid the waste of material and labor due to breakages occurring in the knotting of said springs.

Obviously, the use of springs of desired hardness as distinguished from those insufficiently hard, to prevent shortening thereof in height under influence of load, will permit the use of wire of a lighter gauge and less length for a given height and load capacity of spring than has been possible heretofore, so that in addition to the saving in material and labor effected by providing springs of the character produced by the present machine and by the method aforesaid, there remains the additional and important advantage in the saving of weight of the springs and of spring assemblies into which they are incorporated and the further advantage of producing spring assemblies which will maintain their shape as to height and other dimensions practically permanently.

The machine of the present invention is intended and adapted to effect the manufacture of springs of the type aforesaid at very low cost and with great rapidity.

Figure 1:
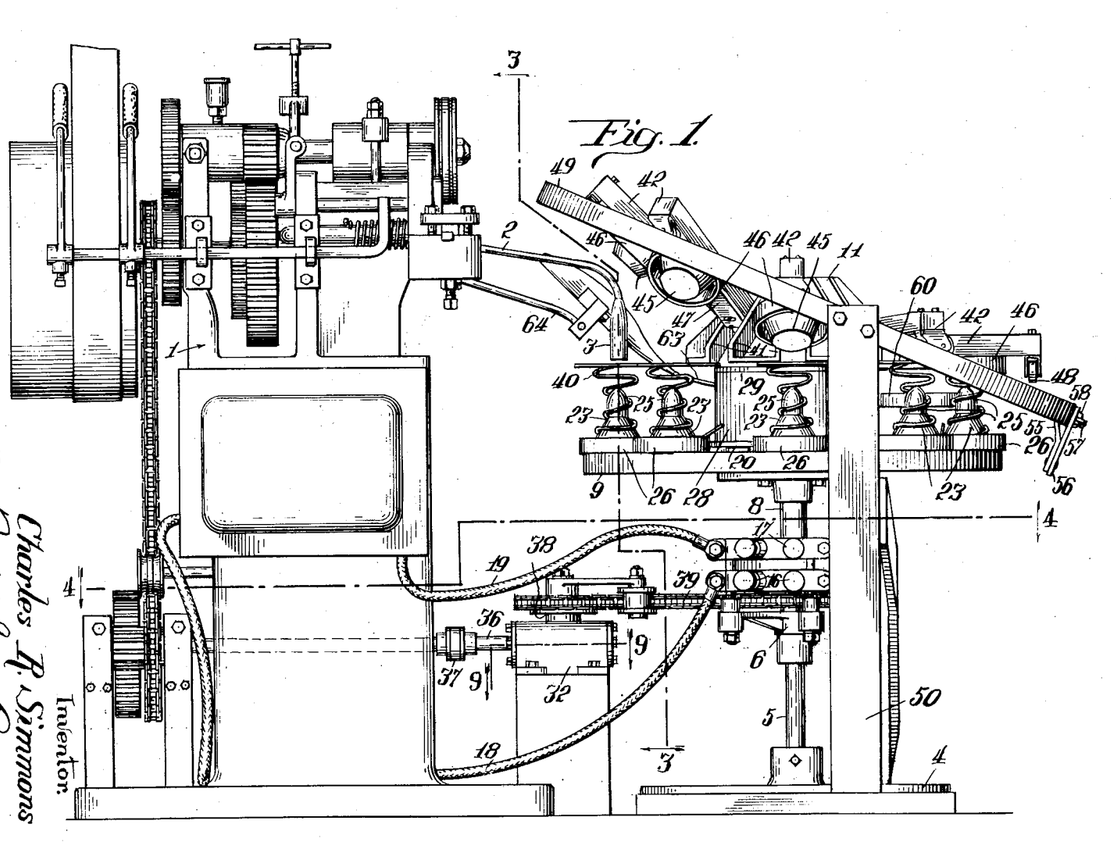
Fig. 1 is a view in side elevation of a machine constructed in accordance with the invention and wherein the same is illustrated as geared to a so-called "coiler" or spring-producing machine from which springs are delivered at regular intervals to the carrier of the machine per se.

Referring first to Fig. 1, there is shown at the left hand side of said figure a conventional type of a so-called "coiler" (1) to which wire is fed from a coil to be formed into upholstery springs which are cut off from the coil automatically and are delivered in the instance illustrated upon a guide rod (2) extending at an incline from the point at which it receives the springs to a point substantially directly above the predetermined point of delivery of the springs, the delivery end portion of said rod (2) being vertically disposed and equipped with a cylindrical head (3) tapered at its upper end portion, said head (3) being of slightly less diameter than the middle portion of an upholstery spring of the hour-glass type for the treatment of which, the machine of the present invention is especially adapted.

Figure 7:
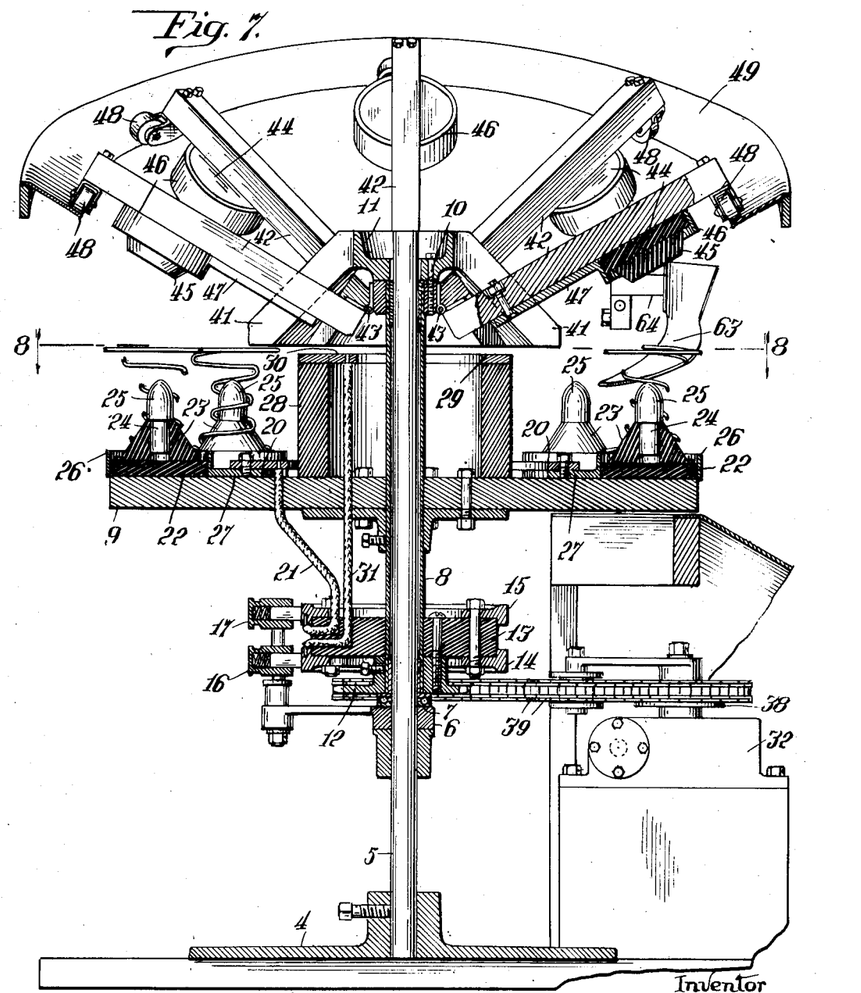
Fig. 7 is a central, vertical, sectional view of the machine taken on the line 7—7 of Fig. 5.

The said machine comprises a suitable base (4) equipped with a central standard (5) upon which there is mounted the collar (6) and upon the latter is mounted the lower member (7) of a ball bearing for the hollow shaft (8) which carries the turn-table or rotatable carrier (9) of the machine (see Fig. 7).

The standard (5) extends to an appreciable height above the point of connection of the turn-table (9) with said hollow shaft and the latter also extends to an appreciable height above said turn-table and at its upper end portion carries the collar (10) and rotatable member (11) which is described in detail hereinafter.

Mounted upon the lower end portion of the hollow shaft (8) is the hub of the sprocket wheel (12). The latter carrying an insulating block (13) upon which there are mounted a pair of ring plates (14) and (15) of metal, which are insulated from each other and are connected, respectively, with the terminals (16) and (17) of an electric circuit, said terminals being connected by means of the cables (18) and (19) with a suitable source of current which is not illustrated, but consists of a generator or transformer delivering electrical energy of 20 volts, more or less, and 150 to 200 amperes, more or less, depending, of course, upon the gauge of wire of which the springs to be tempered are composed, said terminals (16) and (17) are of the brush type. Mounted upon the turn-table (9) is a ring plate (20) which is suitably insulated from said turn-table (9), unless the latter, as in the instance illustrated, is composed of an insulating material, such as wood, or other insulators. Said plate (20) is connected by means of a cable (21) with the ring plate (15).

Mounted upon the turn-table (9) adjacent its periphery is a series of circular insulating blocks (22) upon each of which there is mounted a truncated cone (23), also of insulating material, the base of said cone being of less diameter than the plate (22) and being provided with a central bore to receive the shank (24) of a member or head (25) which is cylindrical and equipped with a tapered or pointed upper end portion and which also is composed of an insulating material.

A metal ring (26) borders each of the circular plates (22) and each ring (26) is equipped with a lateral projection or arm (27) secured to the ring plate (20), thus connecting each of the rings (26) with one pole of the electric circuit.

There is also mounted upon the turn-table (9) a cylindrical member (28) of insulating material disposed concentric with but spaced from the ring (20) and which is equipped at its upper end with a ring plate (29) provided with an inwardly extending projection (30) connected by means of cable (31) with the plate (14) and thus with the other pole of the electric circuit.

Figures 2, 9:
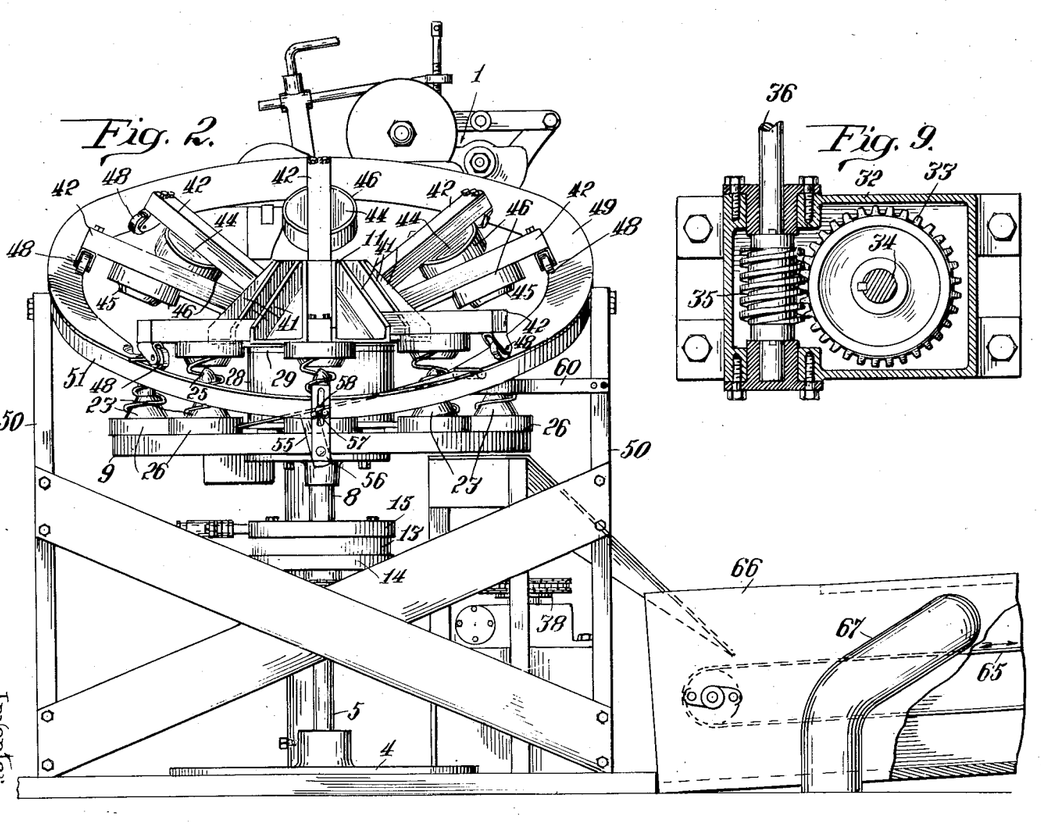
Fig. 2 is a view in side elevation of the tempering machine, per se, as seen from the side opposite that shown in Fig. 1.
Fig. 9 is a fragmentary detail plan sectional view taken on the line 9—9 of Fig. 1 showing the gearing connecting the spindle of the machine drive mechanism of the coiler.
Figures 3, 4:
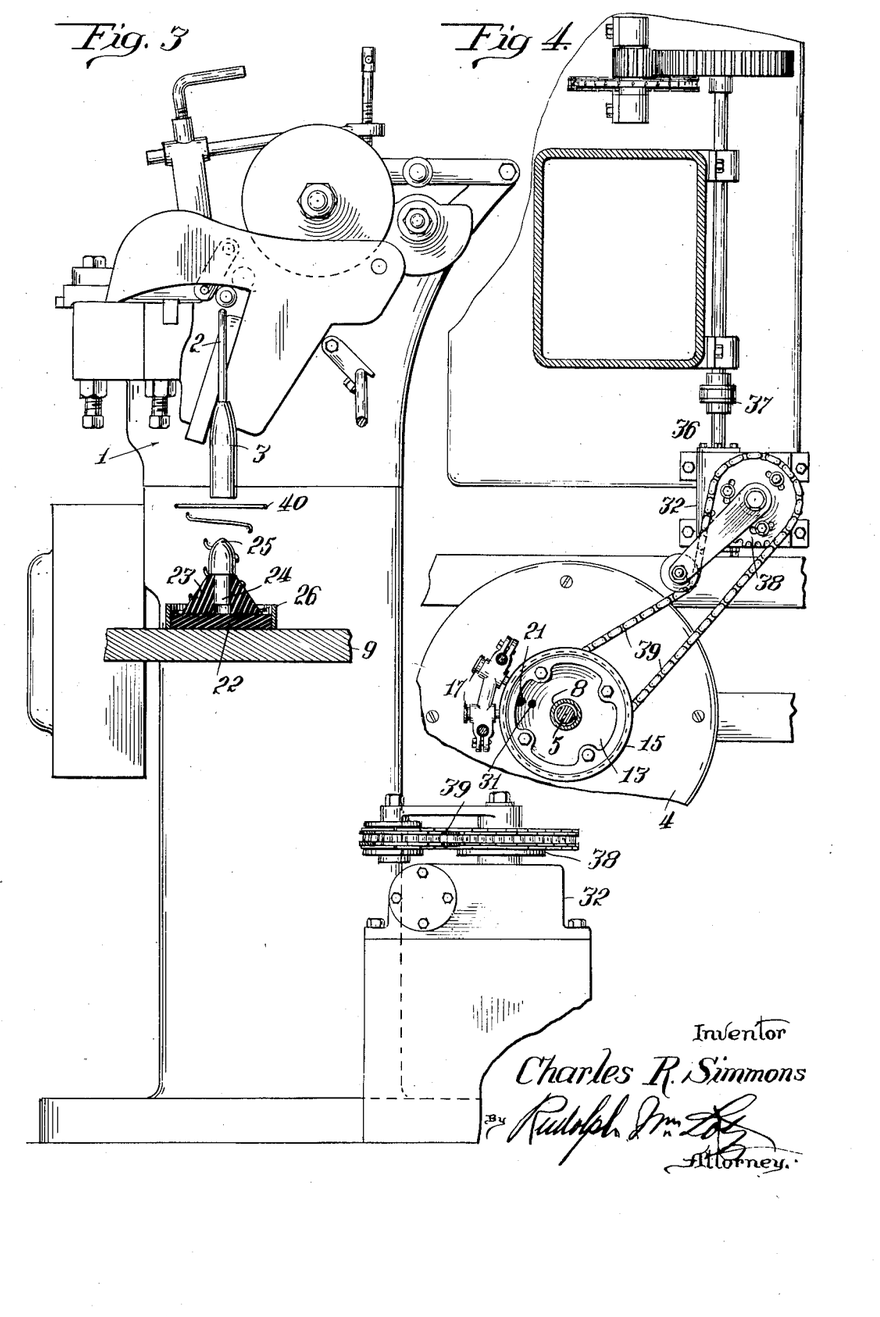
Fig. 3 is a vertical, sectional view of the machine taken on the line 3—3 of Fig. 1.
Fig. 4 is a vertical sectional view of the same taken on the line 4—4 of Fig. 1, said parts thereof being shown as broken away.

Disposed at one side of the base (4) is a gear box (32) containing the worm gear (33) mounted on a shaft (34) and meshing with the worm (35) on a shaft (36) which, as shown in Fig. 1 is coupled, directly or indirectly, by means of the coupling (37) with a shaft geared to the mechanism driving the coiler (1), said gear box and gearing being illustrated in detail in Fig. 9.

The shaft (34) carries a sprocket wheel (38) connected by sprocket chain (39) with the sprocket wheel (12) for driving the hollow shaft (8).

The number of carriers for springs comprising the members (23) to (26) inclusive, mounted upon the turn-table (9) will be determined by the speed of rotation of said turn-table relatively to the speed of production of springs by the coiler (1) and the time interval required to effect heating of the spring to the desired temperature by the closure of the electric circuit through the same, so that at each delivery of a spring from said coiler, one of said carriers will be disposed in vertical alignment with the head (3) of the guide and delivery rod (2) to receive a spring from the latter, said carriers being disposed in a circle equal in radius to the distance between the axis of the standard (5) and the axis of the head (3).

In the instance illustrated, the turn-table (9) is shown as equipped with eight of said spring carriers spaced equi-distantly from each other and, obviously, the gearing between the hollow shaft (8) and the driving gear of the coiler (1) will be such as to synchronize the two machines and cause each spring delivered from the coiler to be delivered upon one of said carriers.

Figures 8, 11:
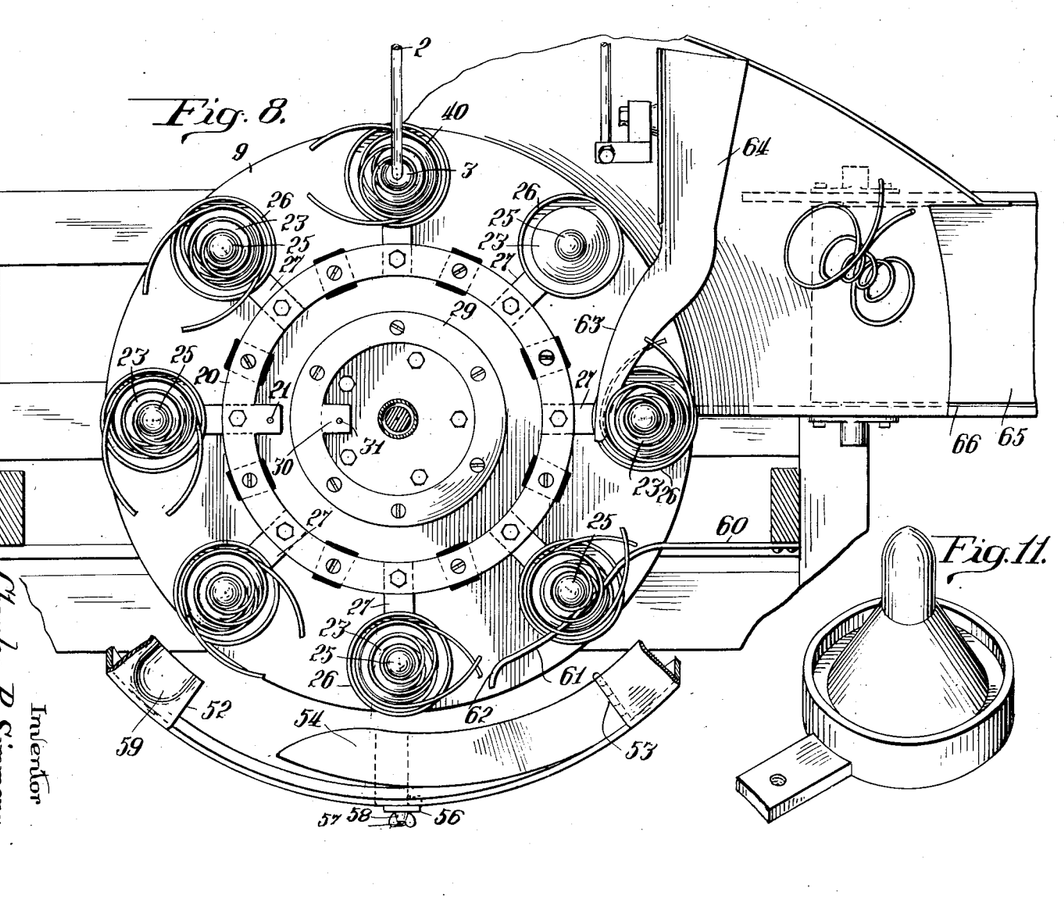
Fig. 8 is a plan section of the machine taken on the line 8—8 of Fig. 7.
Fig. 11 is a perspective view of one of the carrying spindles of the machine.

As shown in Fig. 8, the springs (40) when delivered upon the carriers of the turn-table present projecting end portions constituting the terminals of the spiral end coils of said springs which project a considerable distance from the axis of the spring as defined by the vertical plane of the axis of the rod (2) shown in Fig. 8. The body portions of the terminal coils of the spring (40) are of smaller diameter than the rings (26) so that said projecting terminal end portions of the base coils of the springs (40) will rest upon the rings (26) at a point appreciably spaced from the extremity of said lower end coil.

Mounted upon the upper end portion of the shaft (8) as hereinabove described, is the collar (10) and mounted upon said collar (10) is the member (11) which constitutes a cup-shaped hub portion equipped with a plurality of pairs of outwardly projecting substantially radially disposed arms (41). Each pair of said arms (41) defines a guide slot disposed radially of the hub (11) and in which the arms (42), secured by means of hinges (43) to the collar (10), are received and guided. Each of said arms (42) preferably, is composed of an insulating material, such as wood, and each of said arms is equipped with circular blocks (44) of insulating material and each of said blocks (44) carries an inverted truncated cone-shaped member (45) of insulating material. Each member (44) is bordered by a metallic ring (46), a radially extending arm (47) of which, extends toward the inner and hinged end portion of the arm (42) and is suitably secured to the latter; the inner end portion of each of said arms (47) being disposed vertically over the ring plate (29).

Suitably mounted upon the outer end portion of each of the arms (42) is a caster wheel (48) which rides upon a circular and inclined plate (49). The latter is supported upon the base of the machine by means of the uprights (50) secured at their upper ends to the peripheral flange (51) of said plate (49).

Figures 5, 10:
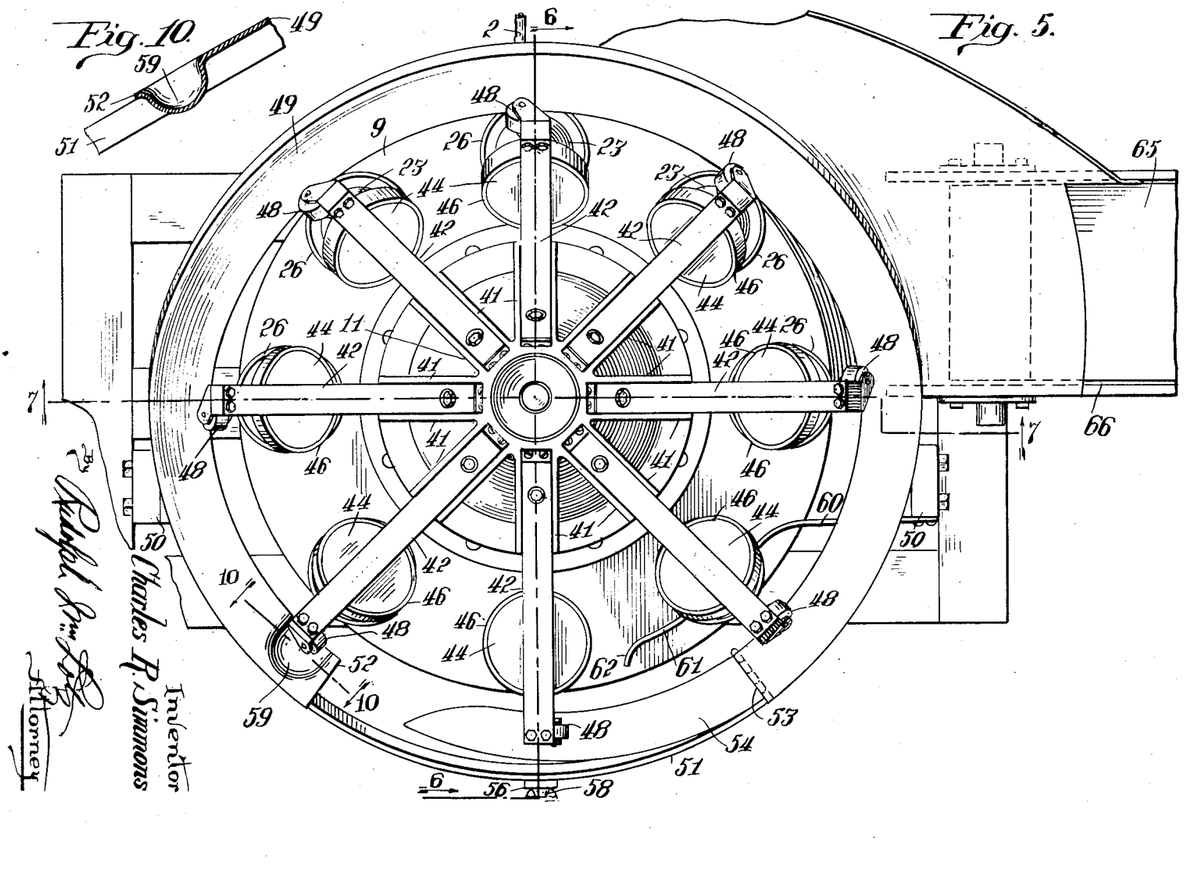
Fig. 5 is a plan view of the machine, per se.
Fig. 10 is a fragmentary detail sectional view on the line 10—10 of Fig. 5.

In that portion of the ring (49) which is disposed at the lowest elevation, the same presents a gap extending from the point (52) to the point (53) shown in Fig. 5 and also in Fig. 8. Hinged to the said plate (49) at the side (53) of the last-mentioned gap, is a plate (54) which is supported at a point between its ends upon a bracket member (55) which is secured to a vertically slotted member (56).

The supporting standards (50) for the plate (49) constitute diametrically opposed pivotal supports for said plate, the latter being capable of being tilted relatively to said support and being held in predetermined desired position relatively to the member (56) by means of the threaded projections (57) extending through the vertical slot of the member (56) and being equipped with a thumb screw (58) for clamping the flange of the plate (49) to the said member (56). The free end portion of the plate (54) is spaced from the terminal (52) of the said gap and rests by gravity upon the said bracket (55) so that as said plate (49) is adjusted to different positions, the plate (54) will become disposed at different angles relatively to the plate (49) which will be described in detail hereinafter.

Figure 6:
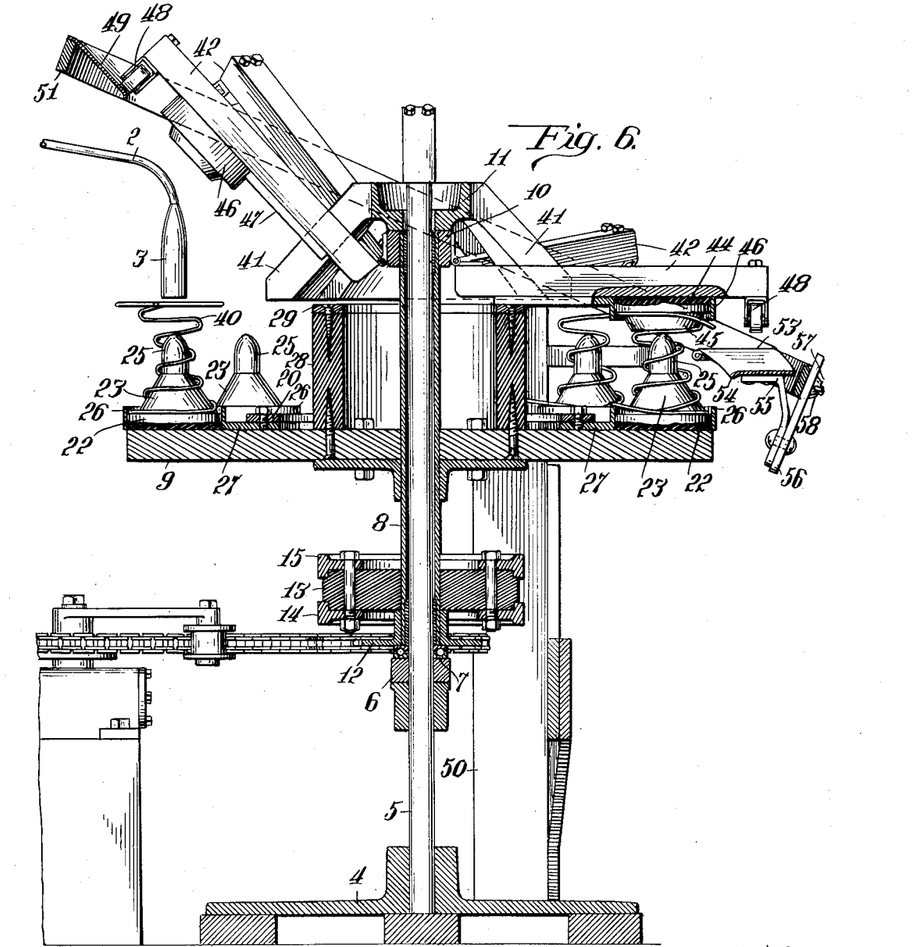
Fig. 6 is a central, vertical, sectional view of the machine taken on the line 6—6 of Fig. 5, and also showing the delivery end portion of the guide and delivery device which receives the springs from the coiler and delivers them to the machine.

It will be noted by reference to Fig. 6, that the uppermost portion of the plate (49) is disposed at an appreciable elevation directly above the rod (2) from which springs are delivered to the carriers of the turn-table and that at this point the arms (42) are disposed at the highest point in their pivotal movement relatively to the collar (10), the arrangement of the plate (49) relatively to the turn-table (9) being such that during rotation of the member (11) the said arms (42) gradually drop down toward the turn-table (9), it being obvious, of course, that said arms (42) correspond in number and location with the spring carriers of the turn-table.

As a caster wheel of one of the arms (42) passes over the terminal (52) of the gap in the plate (49) it drops by gravity so that the upper coil of the spring of the corresponding carrier becomes disposed over the truncated cone member (45) of said arm and the terminal portion of said upper end coil of the spring is brought into contact with the ring (46) of said arm, thereby closing the circuit through the spring when said circuit is closed through the ring (29) and causing the latter to be heated between its points of contact with said respective rings (46) and (26).

Naturally as the spring is subjected to compression by the weight of the arm (42) and the parts carried by the same, the lower end coil of the said spring will be crowded down into the annular space between the ring (26) and the truncated cone member (23). This causes the part of the terminal coil resting upon said ring (26) to be subjected to the scraping action of the sharp inner edge of said ring and thus to be freed from any surface film of oil or grease which could serve to prevent or resist closure of the electric circuit through said spring.

Disposed in the plate (49) adjacent said terminal (52) is a recess (59) into which the caster wheel of the arm drops just previously to dropping off said plate (49) and at this point in its movement the ring (46) is brought into contact with the terminal coil of the spring and out of contact therewith for an instant.

This produces an initial very brief slightly rubbing contact between the ring (46) and the terminal coil of the spring which is effective to clear said point of contact of a film of grease which may envelope the spring at this point and which sometimes serves to prevent the circuit from being closed. However, this initial contact produces not only the rubbing contact by a slight spark as the ring (46) leaves the spring (47) for an instant, it serves also to burn away film of grease covering the spring at the point of contact so that as the ring (46) again contacts with the spring, the passage of current through the latter is assured.

For purposes of accuracy in the production of springs having equal portions thereof tempered and also equally long untempered terminal portions, it is essential that the springs fit the carriers (23)—(25) snugly and that they also fit snugly the truncated cone (45) of the arm (42). As the arm (42) drops out of engagement with the plate (49), its weight is sufficient to compress the springs now disposed in engagement with the truncated cones (23) and (45) to an extent sufficient to bring the inner ends of the arms (47) of the ring (46) into contact with the ring plate (29) so as to complete the circuit through the spring. The close contact or engagement of the truncated cones aforesaid with the springs has a tendency to cause a spring occasionally to be lifted and carried by an arm (42) as the latter rides upon the plate (54) and thence upon the plate (49). To prevent this, there is provided a bracket arm (60) secured to one of the uprights (50) and which is shown in plan view in Fig. 8. Said arm (60) has a free end portion (61) of arcuate form disposed concentric with the axis of the turn-table (9) and an oppositely curved free end portion (62) which is engaged by each of the spring carriers of the turn-table (9) during the travel thereof from a point at which an arm (42) begins to move upwardly by reason of engagement with the plate (54) and to a point at which the truncated cone member (45) of said arm (42) is disengaged from the spring, said free end portion (61) of the arm (60) engaging coils of the spring after the circuit through the latter has been opened and prevents said spring from being lifted off of its carrier by said truncated cone member (45) of said arm (42).

After the spring has passed out of engagement with said arm (61), it is brought into engagement with another arm (63) carried by a bracket arm (64) (shown in Fig. 1) secured to the coiler (1) at a point spaced appreciably from the guide arm (2). By reference to Figs. 1, 7 and 8, it will be noted that said arms (63) extend at a gradually increasing incline from the lower end to the upper end and that said lower end portion thereof is tapered and slightly arcuate so that it terminates in a convex edge (64) (Fig. 8). It will also be obvious that from the moment that the spring of a carrier of the turn-table (9) is disposed in overlapping relation to the lower end portion of the arm (63), it gradually rides to a greater extent upon said arm and thus will be lifted clear of its carrier and as it reaches the position substantially of the convex edge (64), it will drop by gravity from said arm and upon the carrier belt (65) of a chilling box (66) reference being had to Figs. 8 and 1. Air under pressure to effect velocity of travel through the chilling box (66) is supplied by a pipe (67) receiving air from a suitable source such as a blower or other air compressor. The chilling of the hot springs is effected in the chilling box (66) with sufficient rapidity to complete the tempering of said springs and the latter are delivered from the belt (65) in a condition ready for use.

While the operation of the machine will, undoubtedly, be quite clear from the foregoing description, a résumé thereof is supplied hereinafter for purposes of convenience.

We may assume, for example, that the coiler (1) delivers eight springs per minute to the guide rod (2). In such event the turn-table (9) will rotate at the rate of one R. P. M. and during such rotation, springs from the coiler will be delivered in due succession upon each of the eight carriers of the turn-table. At the time of such delivery, a carrier will be supported at the desired point in its terminal coil upon the ring (26) of said spring and there will be no electric current through a spring until the latter attains a point in its travel immediately beyond the terminal end (52) of the plate (49). An instant prior to attaining this position, a ring (46) of an arm (42) will be brought into momentary contact with the upper terminal coil of the spring at the desired point for the purpose of rubbing off from the surface of the spring such slight film of oil as may cover the same.

Immediately after such initial contact between the ring (46) and the spring, the arm (47) carrying the ring (46) will drop by gravity over the terminal edge (52) of the plate (49) and will compress the spring by the weight of said arm and cause the inner end of the arm (47) of the ring (46) to engage the ring plate (29) to complete the electric circuit through the spring.

The electric circuit through the spring remains closed until the arm (42) has ridden sufficiently far upon the plate (54) to open the electric circuit and at substantially this point, the spring will become engaged by the arm (61) and thus held upon its carrier while the truncated cone member (45) of the arm (42) becomes disengaged from said spring. Almost immediately thereafter the spring will be engaged by the arm (63) and lifted off of its carrier and will drop by gravity upon the belt (65) of the chilling box (66) where it will be chilled while being transported to a work bench or to a machine for effecting knotting or effecting incorporation of the spring into a spring assembly.

It will be obvious that the electric circuit through the spring must remain closed for a period less than required for the turn-table to complete one-eighth of a revolution so that the circuit will not be closed simultaneously through two or more springs but will be limited to closure to one spring at a time. Hence the number of carriers and the spacing apart thereof on the turn-table as well as the speed of the latter in synchronism with the speed of delivery of springs to said carriers must be controlled by the interval required for effecting the heating of the springs successively to the desired temperature in a time interval less than is required for the turn-table to complete the fraction of a revolution determined by the number of carriers thereon.

The carriers for springs are easily removed and replaced, as are also the companion members (44), (45), (46) of the arms (42) for replacement, for example, by other carriers of smaller or larger diameter for treating springs of, respectively, smaller or larger diameters than those previously treated in the machine. The duration of passage of current through the springs is determined by adjustment of the position of the plate (54) with respect to the bracket (55) as will be obvious and must be determined by experiment with respect to the gauge of wire of spring being treated and by other factors such as room temperatures and other conditions which might affect the temperature which the heated portion of the spring is intended to attain to secure the best results in hardening thereof.

The machine may be adapted easily to leave only one free end portion of each spring unaffected and also for hardening springs of all types throughout any selected portions thereof without departing from the invention as such adaptations will require no more than ordinary engineering or mechanical skill.

I claim as my invention:

1. A spring annealing means including a carrier for a coiled spring comprising an electrically non-conductive member adapted to engage within a coiled spring for holding the same in a predetermined position, an electric contact member positioned relatively to said first-named member for engagement with a substantially predetermined point in a terminal end coil of the spring spaced from the extremity thereof and constituting a support for the spring, a second contact member similar to the first-named member for similar engagement with the other terminal coil of the spring and movable into and out of engagement therewith, a source of electrical energy connected with said contact members and means whereby the electric circuit between said contact members is closed through a spring engaged therebetween when said contact members are both engaged with said spring.

2. A spring annealing means adapted for annealing upholstery springs throughout predetermined portions thereof which comprises an electrically non-conductive member arranged to enter the spring, a contact member disposed to engage a terminal end portion of a spring disposed upon said member at a point spaced from the adjacent extremity of the said spring, a second contact member movable into and out of engagement with the other terminal end portion of the said spring and an electric circuit arranged to be closed through said spring between the points of contact of said contact members with said spring when both said contact members are engaged with said spring.

3. A spring annealing means adapted for annealing upholstery springs throughout predetermined portions thereof which comprises an electrically non-conductive member arranged to enter the spring, a contact member disposed to engage automatically a terminal end portion of a spring disposed upon said member at a point spaced from the adjacent extremity of the said spring as said first-named member engages in the spring, a second contact member movable into and out of engagement with the other terminal end portion of the said spring and an electric circuit arranged to be closed through said spring between the points of contact of said contact members with said spring when both said contact members are engaged with said spring.

4. A spring annealing means comprising an electrical contact member, an electrically non-conductive member rigid with said contact member and disposed for cooperation with the latter to engage and support a spring to maintain the latter automatically in contact with said contact member at a point in the spring spaced from an extremity thereof, a second contact member movable into and out of engagement with a point in said spring spaced from the point of contact of the latter with the first-named contact member, and an electrical circuit connected with said contact members and adapted to be closed through the portion of the spring disposed between the points of engagement of the latter with said contact members.

5. Mechanism for electrically annealing portions of upholstery springs spaced from the extremities thereof comprising a carrier composed of a non-conductive material adapted to receive an upholstery spring, a contact member associated with said carrier and arranged and positioned relatively to said carrier to engage automatically a terminal end portion of the spring at a point spaced from an extremity of the same while said spring is engaged with said carrier, a second contact member movable into and out of engagement with the other terminal end portion of the spring while the latter is engaged with said carrier and acting to effect partial compression of said spring while engaged with the latter, and an electric circuit connected with said contact members for closure through said spring during engagement of the latter by said contact members.

6. Mechanism for electrically annealing portions of upholstery springs spaced from the extremities thereof comprising a carrier composed of a non-conductive material adapted to receive an upholstery spring, a pair of opposed contact members movable relatively to each other for engagement with opposite terminal end portions of a spring engaged with said carrier and disposed and arranged relatively to said carrier to engage said end portions of the spring at points spaced from the extremities of the latter, and an electric circuit connected with said contact members for closure through the portion of the spring disposed between said contact members.

7. Mechanism for electrically annealing portions of upholstery springs spaced from the extremities thereof comprising a carrier composed of a non-conductive material adapted to receive an upholstery spring, a pair of opposed contact members movable relatively to each other for engagement with opposite terminal end portions of a spring engaged with said carrier and disposed and arranged relatively to said carrier to engage said end portions of the spring at points spaced from the extremities of the latter and to effect partial compression of said spring, and an electric circuit connected with said contact members for closure through the portion of the spring disposed between said contact members.

8. Mechanism for electrically annealing predetermined portions of upholstery springs including a carrier of non-conductive material for engaging springs successively, contact members for engaging predetermined points in the length of each spring, one of said contact members being rigid with the carrier and the other thereof being movable relatively to the carrier for engagement with and disengagement from the spring on the carrier, and both said contact members being positioned and arranged to engage said spring at points spaced from the extremities of the spring, an electric circuit connected at one side with the contact member rigid with the carrier and at its other side with a switch member, the movable contact member constituting also a movable switch member arranged to close the circuit through the spring after engaging and partially compressing the latter, and mechanism for actuating said movable contact member into and out of circuit closing position at predetermined intervals.

9. Mechanism for electrically annealing predetermined portions of upholstery springs including a traveling carrier of non-conductive material for engaging springs successively, contact members for engaging predetermined points in the lengths of each spring, one of said contact members being rigid with the carrier and the other thereof being movable relatively to the carrier for engagement with and disengagement from the spring on the carrier and both said contact members being positioned and arranged to engage said spring at points spaced from the extremities of the spring, an electric circuit connected at one side with the contact member rigid with the carrier and at its other side with a switch member, the movable contact member arranged to close the circuit through the spring after engaging and partially compressing the latter and a rigid guide member arranged relatively to the carrier and the movable contact member for causing the latter to become and remain engaged with the spring on the carrier and close said circuit during a predetermined length of travel of said carrier.

10. Mechanism of the type specified comprising a rotatable member, a non-conductive carrier for springs mounted thereon, a contact member for engagement automatically with a substantially predetermined point in a spring engaged with the carrier and rigid with the latter, a switch member, an electric circuit connected at one side with said switch member and at its other side with said contact member, a second contact member movable relatively to said switch member and said carrier and disposed for travel with the latter and constituting also a switch member for cooperation with said first-named switch member for closing the circuit through the spring on the carrier, and means for throwing said last-named contact member into engagement with said spring and effecting partial compression of the latter and thereafter closing the circuit and maintaining the same closed during a predetermined length of travel of said carrier, said means arranged to restore said last-named contact member to its normal position as said carrier completes said length of travel.

11. Mechanism for electrically annealing upholstery springs throughout a portion spaced from the extremities thereof comprising a carrier of a non-conductive material arranged to receive a spring, a metallic member rigid with said carrier and disposed to engage a terminal end portion of a spring as the latter is received upon the carrier, a second contact member movable relatively to the carrier for engaging the opposite end portion of a spring mounted thereon, a circuit controlling switch of which the last-mentioned contact member constitutes the movable element, an electric circuit connected at one side with said first-mentioned contact member and at its other side with said switch, and means for causing said second contact member to become engaged with and effect partial compression of the spring and when the spring is partially compressed to close the circuit through the spring thereby maintaining the spring in firm contact with said contact members and mechanism for effecting engagement of said movable contact member with said spring throughout a predetermined time interval.

12. Mechanism for the purpose specified comprising a continuously travelling member, a plurality of equally spaced apart carriers for springs composed of electrically non-conductive material mounted on said member, a metallic member rigid with each of said carriers and disposed for contact with springs mounted on said carriers, an electric circuit connected at one side with said metallic members of all of said carriers, a switch member connected with the other side of said circuit, movable switch members arranged for cooperation with said first-named switch member and with the springs mounted on said carriers for closing the electric circuit successively through said springs, a cam member relatively to which said first-named member is movable and arranged for engagement with said movable switch member to cause the latter to be thrown successively into and out of circuit closing position and to maintain the circuit closed through successive springs through a predetermined length of travel of said first-named member, said movable switch members being arranged to effect and maintain partial compression of the successive springs during the period of closure of the circuit through said successive springs, said metallic members and said movable switch members being arranged relatively to the said carriers to cause electric energy to travel through the successive springs from points spaced from the extremities of said springs.

13. A machine of the kind specified including a turn-table equipped with electrically non-conductive devices at regular intervals and equi-distantly from the axis of rotation thereof for successively receiving and holding springs, a metallic device associated with each of said devices and engaging automatically a terminal coil of each of the springs on the device at a point spaced from the extremity thereof, a rotatable member rigid with and spaced from said turn table, a plurality of arms corresponding in number and relative position with said devices pivotally mounted on said last-named member and equipped at their outer ends with spring-engaging elements including metallic members engaging the other terminal coils of said springs at points spaced from the extremities thereof, a member interposed between the plane of travel of the upper terminal coil of springs and the outer end of said arms and causing pivotal movement of the latter, and bringing the said spring-engaging elements thereof into and out of engagement with the springs during travel thereof, an electric circuit having one side connected with all of said first-named metallic members and operatively connected with said arms to close the circuit successively through said springs between the points of contact of said metallic elements therewith during the period of engagement of the springs between said devices and said spring-engaging elements of said arms, said last-named member determining the duration of the last-named engagement of said springs and the corresponding period of circuit closure through the same.

14. A machine of the type specified including a turn-table, a plurality of spaced apart electrically non-conductive spindles mounted on said turn-table and constituting carriers engaging in springs for holding the latter firmly during travel of said turn table, a metallic member rigid with each of said spindles and disposed for contact with the lower terminal coil of the spring on the spindle, an electric circuit connected at one side with all of said metallic members, a switch member connected with the other side of said circuit, a member rigid with said turn-table, a plurality of arms pivotally mounted on said member at one end and equipped at their other ends with metallic members adapted to engage the other end portions of springs on said several spindles, said switch member constituting a stop for limiting the pivotal movement of said arms in one direction and said arms constituting means for connecting said switch with said springs as said arms contact with said switch member and said springs, and a cam member disposed in the path of travel of said arms for maintaining the same out of engagement with said switch member and said springs during a predetermined arc of their travel and causing the same to be engaged with said switch member and said springs during another arc of their travel.

15. The combination with a spring producing machine, of a traveling carrier equipped with a series of spring receiving and engaging devices, gearing between said machine and said carrier for operating the same in synchronism to bring one of said devices into spring receiving position coincidentally with delivery of a spring from said machine, and mechanism associated with said carrier for electrically heating the springs on the carrier during a predetermined length of travel of said carrier.

16. The combination with a spring producing machine, of a traveling carrier equipped with a series of spring receiving and engaging devices, gearing between said machine and said carrier for operating the same in synchronism to bring one of said devices into spring receiving position coincidentally with delivery of a spring from said machine, a guiding device mounted upon the said machine and about which the successive springs are coiled during formation thereof, said guiding device being disposed relatively to said spring receiving devices to deliver spring successively to the latter, and mechanism associated with said carrier for electrically heating the springs on the carrier during a predetermined length of travel of said carrier.

17. A machine for electrically annealing upholstery springs comprising a traveling carrier equipped with a series of spaced apart spring-engaging devices composed of electrically non-conductive material, an electric circuit, a spring engaging contact member associated with each of said devices and arranged for contact automatically with a point in the spring on the device with which said member is associated at a substantially predetermined point in the length of the spring, all of said contact members being connected with one side of the said circuit, a similar series of movable contact members arranged for engagement with said springs at points removed from the points of contact of said first-named contact members, means for maintaining said second series of contact members out of engaging relation to springs on the carrier except through a predetermined length of travel of said carrier and causing the same to engage said springs successively during another predetermined length of travel of the carrier, and means whereby said second contact members are connected with the other side of said circuit during the last-mentioned length of travel of said carrier.

18. A spring annealing machine comprising a rotatable carrier, a plurality of spaced apart electrically non-conductive spring supporting devices mounted thereon, each of said devices equipped with a metallic contact member positioned to engage the spring thereon at a substantially predetermined point in the length thereof, an electric circuit connected at one side with all of said contact members, companion contact members movable relatively to said supporting members into and out of engagement with springs at substantially predetermined points in the length thereof spaced from the points of engagement therewith of the first-named contact members, means for maintaining said second contact members out of engagement with said springs during a predetermined length of travel of said carrier and causing the same to engage said springs during another predetermined length of travel of said carrier, a switch member connected with the other side of said circuit and positioned in the path of movement of the second-named set of contact members for engagement therewith during the period of their engagement with said springs for closing the circuit through the latter, and means for automatically disengaging the springs from said supporting members at a given point in the travel of said carrier.

19. A spring annealing machine comprising a rotatable carrier, a plurality of spaced apart electrically non-conductive spring supporting devices mounted thereon, each of said devices equipped with a metallic contact member positioned to engage the spring thereon at a substantially predetermined point in the length thereof, an electric circuit connected at one side with all of said contact members, companion contact members movable relatively to said supporting members into and out of engagement with springs at substantially predetermined points in the length thereof spaced from the points of engagement therewith of the first-named contact members, means for maintaining said second contact members out of engagement with said springs during a predetermined length of travel of said carrier and causing the same to engage said springs during another predetermined length of travel of said carrier, a switch member connected with the other side of said circuit and positioned in the path of movement of the second named set of contact members for engagement therewith during the period of their engagement with said springs for closing the circuit through the latter, means for causing said last-named contact members to engage said springs for an instant prior to the last-mentioned period of engagement with the same for effecting removal of oil from the surfaces of the springs at the point of subsequent electrical contact with the same by said second contact members, and means for automatically disengaging the springs from the said supporting members at a given point in the travel of said carrier.

20. An automatic spring producing and annealing machine comprising a conventional spring coiling machine operable to deliver springs at regular intervals, a traveling carrier geared to said coiling machine for movement synchronously therewith, a plurality of equally spaced apart spring receiving and engaging devices on said carrier arranged to receive springs successively from said coiling machine synchronously with delivery thereof from the latter, said devices composed of electrically non-conductive material, an electric circuit, a contact member associated with each of said devices and connected with one side of said circuit, each of said contact members disposed for automatic engagement with the spring on the device with which it is associated at a point between the ends of the spring, a companion contact member for each device movable into and out of engaging relation to a spring engaged with the latter and arranged to engage said spring at another point between the ends thereof, means for bringing each of said movable contact members successively into engagement with a spring at a given point in the travel of the carrier and throwing the same out of said engagement at another point in said travel and maintaining the same out of such engagement during the remainder of the travel of said carrier, a switch member connected with the other side of the circuit and constituting a stop member for limiting the movement of each of the several movable contact members in the direction of engagement of the latter with said springs, the engagement of said last-named contact members with said switch member and said springs closing the circuit through the latter.

21. A spring producing and annealing mechanism comprising a conventional spring coiler, a rotatable carrier geared to the latter, a series of equally spaced spring-receiving and engaging members of non-conductive material mounted on said carrier and arranged to receive springs successively from said coiler, an electric circuit, a switch element disposed axially of the carrier and connected with one side of said circuit, movable switch levers rotatable with said carrier and corresponding in number and location with said members for engagement with said switch element and said springs for connecting the latter with said side of said circuit, contact devices connected with the other side of the circuit and disposed relatively to said members for engaging the springs engaged by the latter, and a rigid cam member disposed in the path of said levers and causing each of the latter to be engaged with said switch element and a spring during a predetermined arc of movement of said carrier and to be maintained free of such engagement throughout the remainder of a revolution of said carrier.

22. A spring producing and annealing mechanism comprising a conventional spring coiler, a rotatable carrier geared to the latter, a series of equally spaced spring receiving and engaging members of non-conductive material mounted on said carrier and arranged to receive springs successively from said coiler, an electric circuit, a switch element disposed axially of the carrier and connected with one side of said circuit, movable switch levers rotatable with said carrier and corresponding in number and location with said members for engagement with said switch element and said springs for connecting the latter with said side of said circuit, contact devices connected with the other side of the circuit and disposed relatively to said members for engaging the springs engaged by the latter, and a rigid cam member disposed in the path of said levers and causing each of the latter to be engaged with said switch element and a spring during a predetermined arc of movement of said carrier and to be maintained free of such engagement throughout the remainder of a revolution of said carrier, said levers and devices being disposed relatively to said members to engage the springs at points spaced from the extremities of said springs and from each other.

23. A spring producing and annealing mechanism comprising a conventional spring coiler, a rotatable carrier geared to the latter, a series of equally spaced spring receiving and engaging members of non-conductive material mounted on said carrier and arranged to receive springs successively from said coiler, an electric circuit, a switch element disposed axially of the carrier and connected with one side of said circuit, movable switch levers rotatable with said carrier and corresponding in number and location with said members for engagement with said switch element and said springs for connecting the latter with said side of said circuit, contact devices connected with the other side of the circuit and disposed relatively to said members for engaging the springs engaged by the latter, and a rigid cam member disposed in the path of said levers and causing each of the latter to be engaged with said switch element and a spring during a predetermined arc of movement of said carrier and to be maintained free of such engagement throughout the remainder of a revolution of said carrier and a rigid spring-engaging device disposed in the path of springs disposed on said members and located at a point in the travel of the carrier beyond that portion of its travel wherein said levers engage said springs and switch element for disengaging the springs successively from said members.

24. A spring producing and annealing mechanism comprising a conventional spring coiler, a rotatable carrier geared to the latter, a series of equally spaced spring receiving and engaging members of non-conductive material mounted on said carrier and arranged to receive springs successively from said coiler, an electric circuit, a switch element disposed axially of the carrier and connected with one side of said circuit, movable switch levers rotatable with said carrier and corresponding in number and location with said members for engagement with said switch element and said springs for connecting the latter with said side of said circuit, contact devices connected with the other side of the circuit and disposed relatively to said members for engaging the springs engaged by the latter, and a rigid cam member disposed in the path of said levers and causing each of the latter to be engaged with said switch element and a spring during a predetermined arc of movement of said carrier and to be maintained free of such engagement throughout the remainder of a revolution of said carrier and spring discharging means located at a point in the travel of the carrier beyond that portion of its travel wherein said levers engage said springs and switch element for disengaging the spring successively from said members.

25. A spring producing and annealing mechanism comprising a conventional spring coiler, a rotatable carrier geared to the latter, a series of equally spaced spring receiving and engaging members of non-conductive material mounted on said carrier and arranged to receive springs successively from said coiler, an electric circuit, a switch element disposed axially of the carrier and connected with one side of said circuit, movable switch levers rotatable with said carrier and corresponding in number and location with said members for engagement with said switch element and said springs for connecting the latter with said side of said circuit, contact devices connected with the other side of the circuit and disposed relatively to said members for engaging the springs engaged by the latter, and a rigid cam member disposed in the path of said levers and causing each of the latter to be engaged with said switch element and a spring during a predetermined arc of movement of said carrier and to be maintained free of such engagement throughout the remainder of a revolution of said carrier, said levers and devices being disposed relatively to said members to engage the springs at points spaced from the extremities of said springs and from each other and a rigid spring engaging device disposed in the path of springs disposed on said members and located at a point in the travel of the carrier beyond that portion of its travel wherein said levers engage said springs and switch elements for disengaging the springs successively from said members.

26. A spring producing and annealing mechanism comprising a conventional spring coiler, a rotatable carrier geared to the latter, a series of equally spaced spring receiving and engaging members of non-conductive material mounted on said carrier and arranged to receive springs successively from said coiler, an electric circuit, a switch element disposed axially of the carrier and connected with one side of said circuit, movable switch levers rotatable with said carrier and corresponding in number and location with said members for engagement with said switch element and said springs for connecting the latter with said side of said circuit, contact devices connected with the other side of the circuit and disposed relatively to said members for engaging the springs engaged by the latter, and a rigid cam member disposed in the path of said levers and causing each of the latter to be engaged with said switch element and a spring during a predetermined arc of movement of said carrier and to be maintained free of such engagement throughout the remainder of a revolution of said carrier, said levers and devices being disposed relatively to said members to engage the springs at points spaced from the extremities of said springs and from each other, and spring-discharging means located at a point in the travel of the carrier beyond that portion of its travel wherein said levers engage said springs and switch element for disengaging the springs successively from said members.

27. In a machine of the kind specified, a spring engaging member composed of electrically non-conductive material and adapted to enter and engage a smaller diameter portion of a spirohelical upholstery spring for maintaining the latter disposed substantially co-axially with said member, a metallic ring disposed concentric with said member and having a diameter less than the largest diameter of one terminal coil of the spring engaged with said member and arranged relatively to the latter to engage one point in a terminal coil of said spring spaced from the extremity of the said spring, an electric circuit connected at one side with said ring, and a device movable into and out of engagement with another point in said spring and connected with the other side of said circuit when engaged with said spring for closing said circuit through the portion of the spring disposed between the points of engagement therewith of said ring and said device.

CHARLES R. SIMMONS.